Feb. 14, 1933.  H. H. GARNER ET AL  1,897,371
CLEANABLE INLET FOR AIR CLEANERS
Filed Aug. 5, 1929
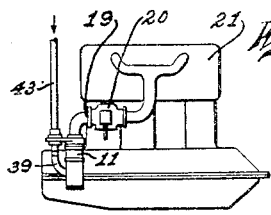
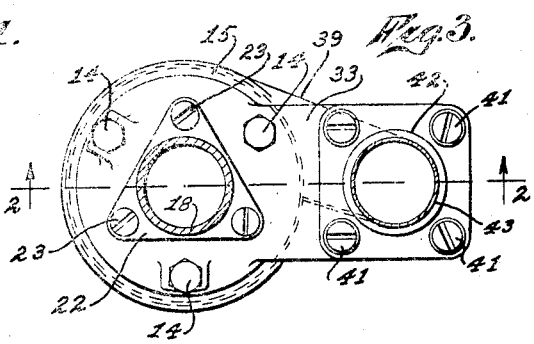
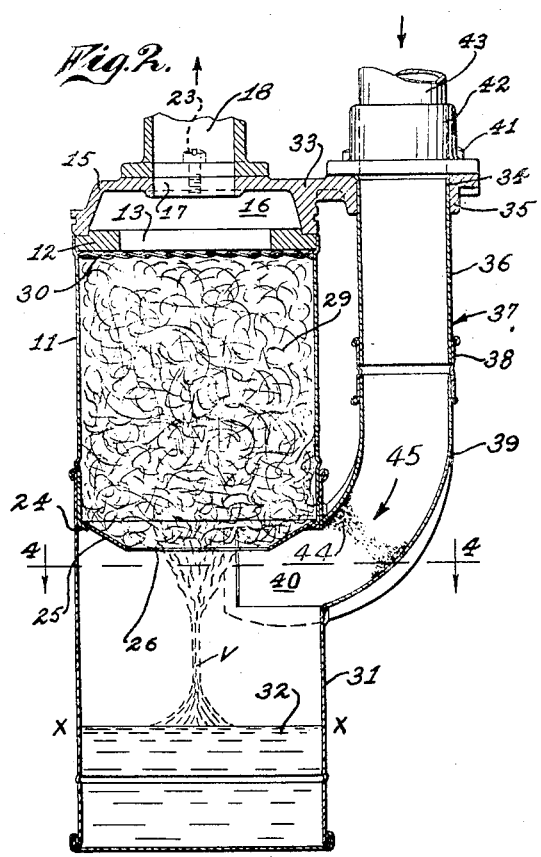
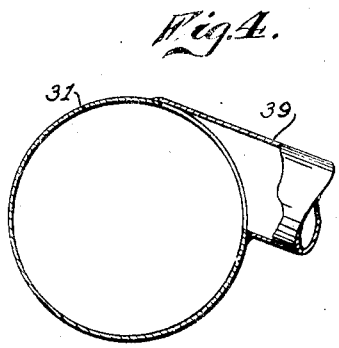
INVENTORS:
Herman H. Garner,
Fred R. Nohavec,
George Harold Hopkins,
By
ATTORNEY.

Patented Feb. 14, 1933

1,897,371

UNITED STATES PATENT OFFICE

HERMAN H. GARNER AND FRED R. NOHAVEC, OF CLAREMONT, AND GEORGE HAROLD HOPKINS, OF PASADENA, CALIFORNIA, ASSIGNORS TO VORTOX MANUFACTURING COMPANY, OF CLAREMONT, CALIFORNIA, A CORPORATION OF CALIFORNIA

CLEANABLE INLET FOR AIR CLEANERS

Application filed August 5, 1929. Serial No. 383,631

Our invention relates to air cleaners which are applied to the intake of internal combustion engines for the purpose of removing dust and dirt from the air before it enters the engine.

The form of air cleaner to which our invention particularly relates has a shell containing a filter medium to which an oil containing can is attached. The upper part of the shell is connected to the intake of an engine and the lower part thereof has an air inlet tangentially connected thereto. When the engine is started a partial vacuum is placed on the air cleaner and air is drawn therethrough. The air is first drawn into the can where a vortex is created which throws the dust particles to the wall of the can. The air is then drawn through the filter, carrying some oil therewith for wetting the filter medium, and the filter medium removes from the air any remaining dust particles.

The interior of the can is wetted with oil and the dust does not cake thereon, and the air inlet is dry to a point near the mouth thereof which connects to the can and the dirt does not collect therein. There is a damp zone between the wet and dry area where the dirt adheres and forms a cake which if allowed to remain reduces the efficiency of the air cleaner.

It is the broad object of our invention to provide an air cleaner of the general type outlined above in which the dirt cake may be readily removed from the air inlet.

A further object of our invention is to provide an air cleaner in which the air inlet is conveniently exposed for cleaning when the oil can is detached from the shell.

A still further object of our invention is to provide an air cleaner in which the air inlet is connected to the oil can, preferably at the upper part thereof so that when the oil can is removed the air inlet may be readily cleaned.

The invention is capable of receiving a variety of mechanical expressions, one of which is shown on the accompanying drawing, but it is to be expressly understood that the drawing is for the purpose of illustration only and is not to be construed as a definition of the limits of the invention, reference being had to the appended claims for that purpose.

In said drawing,—

Fig. 1 is a side elevation of a portion of the internal combustion engine to which our invention has been applied.

Fig. 2 is a cross section through the air cleaner proper.

Fig. 3 is a plan view of Fig. 2, illustrating the top closure casting.

Fig. 4 is a section on a plane indicated by the line 4—4 of Fig. 2.

In the embodiment of our invention illustrated in the drawing, 11 is a cylindrical shell which has fitted in its upper end a plate 12 having a relatively large central opening 13. Secured to the plate 12 by bolts 14 is a supporting structure or closure for the shell 11 in the form of a casting 15 of inverted conical configuration, providing a dome 16 at the upper part of the casing and communicating through the central opening 13 of the plate 12 with the interior of the shell 11. The closure 15 is formed with an axial opening 17, and a pipe 18 leading to the intake 19 of a carburetor 20 of an internal combustion engine 21 is formed with a triangular shaped flange 22 which is secured by means of bolts 23 to the top of the closure 15, the said pipe 18 being in alignment with the closure opening 17.

The lower edge of the wall forming the shell 11 is bent inwardly at an angle to form an annular flange 24 which is adapted to support a frusto-conical plate 25 having a central opening 26.

A body of filter material 29 in the form of lengths of crimped and interentangled wires is packed into the shell 11 and supported upon the plate 25. A flat tray 30 formed of interspliced lengths of wire is placed over the top of the filter material 29 and engages snugly against the lower surface of the plate 12 in the upper part of said casing so that said filter material is held in semipacked formation.

Telescopically connected to the lower end of the shell 11 and secured thereto in any appropriate manner is a can 31. The can 31 is adapted to contain a body of oil 32, the level of which is indicated at X—X in Fig. 2.

The closure 15 is formed with a rectangular extension 33 having an opening 34, and surrounding said opening 34 is a depending annular flange 35. The upper section 36 of an air inlet pipe 37 has its upper end fitted within the opening 34 of the casting extension 33, and its lower end is received within a collar 38 on the upper end of an elbow section 39 forming the lower section of the air inlet pipe 37. The lower end of the elbow pipe section 39 is curved inward toward the periphery of the can 31 and is connected to the upper part of the can 31 in such a manner that it admits air tangentially into an opening 40 in the can 31 partly above and partly below the lower edge of the plate 25. Secured to the upper surface of the extension 33 of the closure casting 15 by means of bolts 41 is a collar 42 having an opening which communicates with the inlet pipe section 36. An inlet pipe 43 is secured in any appropriate manner in the opening of the collar 42 and leads from the atmosphere.

The method of operation of the invention is as follows:

Before starting the engine, the can 31 is removed and the oil is placed therein, the can being then replaced. Whenever the engine is started, it creates a vacuum inside the shell 11 and the chamber in the oil can 31 above the oil, this vacuum drawing air in violently through the air inlet pipe 37. By reason of the tangential direction given to the air as it enters the can, the air is centrifugated. Due to the centrifugal action a vortex is formed in the chamber in the oil can above the oil, oil is drawn upward into the chamber impregnating the incoming air and thoroughly wetting the walls of the oil can. The dust particles due to their weight are thrown to the wall of the oil can by the centrifugal action in the chamber, and the air which is drawn from the chamber through the filter is entirely cleaned with the exception of lighter particles of dust which are not acted on by the centrifuge sufficiently to separate them from the air.

At the center of the vortex a spray of oil V is drawn upward with the air into the filter medium, which oil wets the filter medium and increases its filtering efficiency. The air is then drawn from the air cleaner through the conduit 18 into the engine 21.

As explained the oil in the oil can 31 thoroughly washes the wall of the can and for this reason the dust particles will not cake thereon but will be carried downward along the wall to the bottom of the oil can. The air passing through the air inlet is dry and consequently there will be no tendency for the dust particles to collect thereon. Between the wet and dry areas there is a damp or moist zone, indicated by the numeral 45, and in this zone the dust will cake as indicated at 44 clogging the passage if permitted to collect indefinitely.

It is necessary to remove the oil can at intervals to clean it and replenish it with new oil. When the oil can is detached the mouth 40 and the moist zone are accessible for cleaning because the air inlet is connected to the oil can. The air inlet is connected to the oil can very close to its upper edge which facilitates the cleaning of the dust cake from the air inlet.

We claim as our invention:

1. In an air cleaner the combination with a shell connected to an engine, a filter medium in said shell, a can detachably connected to said shell, of: an air inlet for said filter having a primary part and a secondary part detachably connected together, said primary part being supported by said shell and said secondary part being secured to the wall of said can so that the passage thereof is in communication with the interior of said can, said secondary part being removable from said shell with said can, the mouth of said inlet being exposed when said can is detached.

2. An air filter comprising: a shell; a can connected to the lower end of said shell; a top for the upper end of said shell; and a sectional pipe forming an air inlet for said filter, one of said pipe sections being removable with said can and the other section being removable with said top.

3. An air filter comprising: a shell; a can attached to said shell; a closure for one end of said shell having an air outlet opening therein; an air inlet pipe formed in sections, one of said sections being attached to said can and the other of said pipe sections being attached to said closure; means forming a vortex of sufficient strength to draw air through said inlet pipe into said can; and means for forming an accumulation of dirt in said air inlet pipe.

4. An air filter comprising: a shell; a can removable from the lower end of said shell adapted to contain a liquid; and an air inlet member communicating with the interior of said can, said air inlet member having an outer portion and a dust accumulating portion adjacent said can, said dust accumulating portion being secured to said can and being separable from said outer portion so as to be readily accessible for inspection and cleaning when said can is removed from said shell and said dust accumulating portion is detached from said outer portion.

5. An air filter comprising: a shell; a can removable from the lower end of said shell adapted to contain a liquid; and an air inlet member communicating with the interior of said can, said air inlet member havng an outer porton and a dust accumulating portion adjacent the point of communication of said inlet member with said can, and said dust accumulating portion being detachable from said outer portion to provide for facility of inspection and cleaning.

6. An air filter comprising: a shell; a can removable from the lower end of said shell adapted to contain a liquid; and an air inlet member communicating with the interior of said can, said air inlet member having a dust accumulating portion detachable from the remainder of said inlet member so as to provide ready access to the interior of said dust accumulating portion.

7. An air cleaner of the character described, including: a supporting structure adapted for connection to the air inlet of an air utilizing device; a filter member detachably secured to said supporting structure in such position that air entering said air utilizing device will pass through said filter member; a cup for holding a liquid, detachably secured to said filter member, said cup having walls forming an air inlet member leading into said cup, said walls being so formed that the interior of said air inlet member will be exposed and accessible when said cup is detached from said filter member; and an air inlet pipe leading downwardly from said supporting structure so as to communicate with the entrance opening of said air inlet member.

In testimony whereof, we have hereunto set our hands at Claremont, California, this 30 day of July, 1929.

HERMAN H. GARNER.
FRED R. NOHAVEC.
GEORGE HAROLD HOPKINS.